No. 762,744. PATENTED JUNE 14, 1904.
C. R. McKAY.
MEANS FOR REGULATING DYNAMO ELECTRIC MACHINES.
APPLICATION FILED NOV. 23, 1901.
NO MODEL.

Witnesses.
J. Ellis Glenn.
Benjamin B. Hull

Inventor.
Charles R. McKay.
by Albert G. Davis
Atty.

No. 762,744.

Patented June 14, 1904.

UNITED STATES PATENT OFFICE.

CHARLES R. McKAY, OF CINCINNATI, OHIO, ASSIGNOR TO GENERAL ELECTRIC COMPANY, A CORPORATION OF NEW YORK.

MEANS FOR REGULATING DYNAMO-ELECTRIC MACHINES.

SPECIFICATION forming part of Letters Patent No. 762,744, dated June 14, 1904.

Application filed November 23, 1901. Serial No. 83,422. (No model.)

*To all whom it may concern:*

Be it known that I, CHARLES R. McKAY, a citizen of the United States, residing at Cincinnati, county of Hamilton, State of Ohio, have invented certain new and useful Improvements in Means for Regulating Dynamo-Electric Machines, of which the following is a specification.

My present invention relates to the regulation more especially of alternating-current dynamo-electric machines, and comprises certain novel features set forth with particularity in the appended claims.

For a description of my invention and of its mode of application and operation reference is to be had to the following specification, taken in connection with the accompanying drawings, in which—

Figure 1:
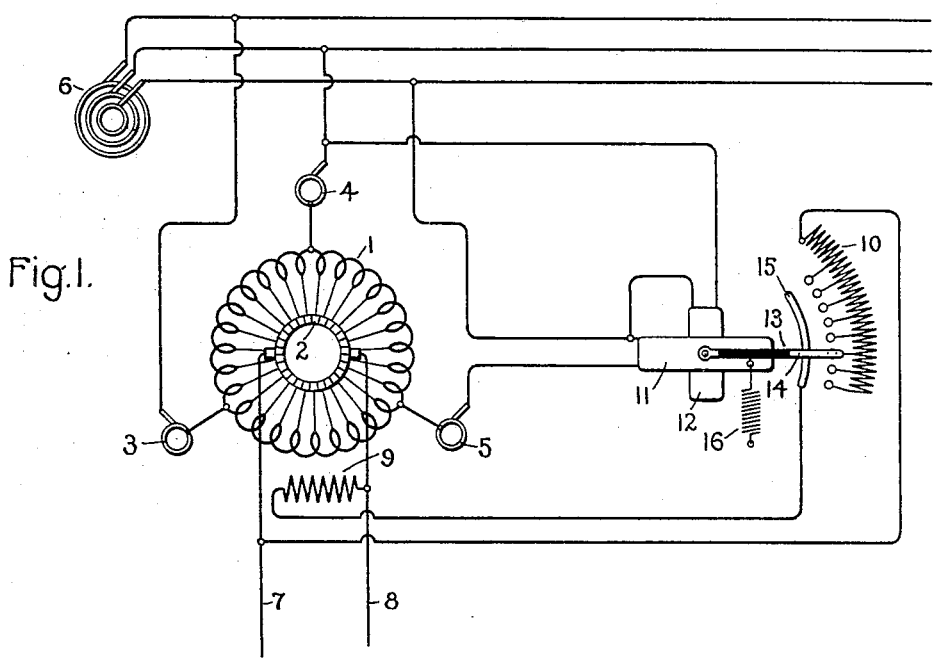
Figure 2:
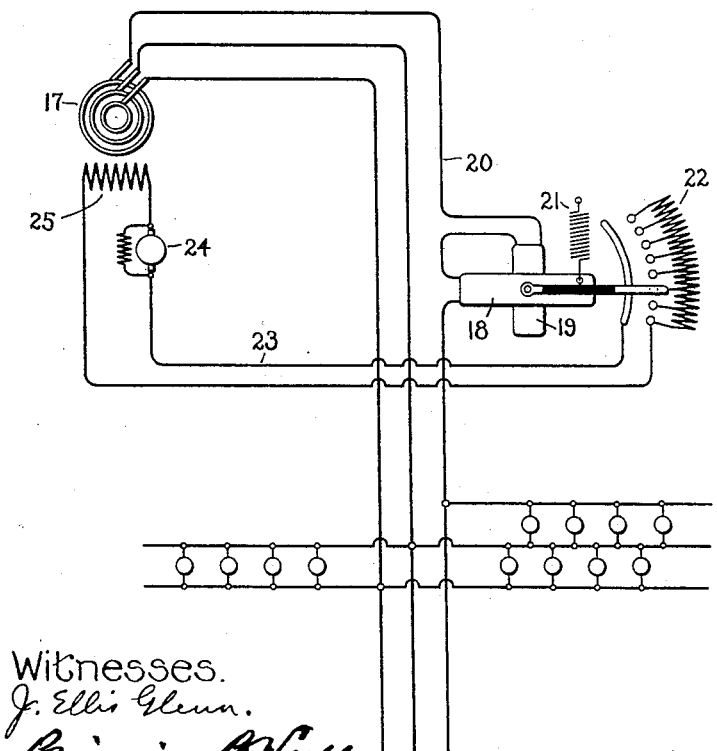

Figure 1 represents in diagram one embodiment of my invention, and Fig. 2 a modification thereof.

Fig. 1 represents my invention as arranged for the regulation of a three-phase rotary converter. This rotary converter may be of ordinary construction and comprises an armature-winding 1, to which a commutator 2 and collecting-rings 3 4 5 are connected in the usual manner. The collecting-rings through brushes bearing thereon receive current from some suitable source—as, for example, from a three-phase generator, (indicated at 6.) Brushes bearing upon the commutator supply current to the direct-current mains 7 and 8. Across these mains is connected the field-winding 9 of the rotary converter, in series with which is an adjustable resistance 10. In order to obtain proper regulation of the rotary converter by variation of this adjustable resistance, I make use of a controlling device for the adjustable resistance consisting of an mechanism in the nature of an electrodynamometer. This electrodynamometer in the present instance consists of two coils, one of which, 11, is connected in series with one of the three-phase mains of the rotary converter—as, for example, the main extending to the collector-ring 5. The other coil, 12, is connected in shunt to a pair of the three-phase mains, the connections being made, as shown, across the two mains which connect, respectively, with the collector-rings 4 5. The coils 11 and 12 are arranged the one within the other, so that currents in the coils mutually interact and produce a torque approximately proportional to the energy supplied to the rotary converter. One of the coils—as, for example, the coil 11—is made movable and carries a contact-arm 13, upon the end of which is mounted a bridging-contact 14, adapted to make contact with a single elongated segmental fixed contact 15 and different points in the resistance 10. To secure a returning moment for the movable coil, I may make use of any suitable means—such, for example, as a spring 16. As the voltage of current flowing in the supply-circuit of the rotary converter changes the position of the rheostat-arm, or, in other words, the contact traversing the fixed contacts of the variable resistance, acts to vary the said resistance, and so change the field excitation of the rotary converter. This change in field excitation, reacting upon the inductance present in the transmission-lines but not illustrated locally in the present case, operates to change the voltage at the alternating-current terminals of the converter and by consequence at the direct-current terminals, thereby controlling the voltage at the direct-current terminals.

Fig. 2 shows my invention as applied to a three-phase generator 17. The dynamometer in this case consists of two relatively movable coils 18 19 in series with each other and with one of the mains 20, extending from the generator 17. Varying current in this main causes the movable member 18 to move against the tension of its restoring-spring 21, thereby altering the amount of the resistance 22, connected in series with the exciter-circuit 23 of the said generator. This exciter-circuit, as will be seen, receives current from the exciter 24 and supplies the same to a field-winding 25 of the generator. This current is regulated in response to variation of current flowing in one of the leads of the generator, as already described.

It is obvious that my invention is capable of many other applications than those shown and that as to those shown much variation may be made in the details of arrangement and proportion of parts without departing from the spirit of the invention.

What I claim as new, and desire to secure by Letters Patent of the United States, is—

1. The combination of an alternating-current dynamo-electric machine, a field-winding thereon excited by direct current, an electrodynamometer with relatively movable coils supplied with current from alternating-current leads connected to said machine, and means controlled by said electrodynamometer for varying the field strength of said dynamo-electric machine.

2. The combination with an alternating-current dynamo-electric machine, of an electrodynamometer having relatively movable coils, one in series with one of the mains of said machine and another in shunt to mains of said machine, and means controlled by said electrodynamometer for varying the field strength of said dynamo-electric machine.

3. The combination of an alternating-current dynamo-electric machine, a field-winding thereon excited by direct current, an electrodynamometer responsive to the energy flowing in mains connected to said machine, and means controlled by relative movement of coils of said dynamometer for varying the field strength of said machine.

In witness whereof I have hereunto set my hand this 19th day of November, 1901.

CHARLES R. McKAY.

Witnesses:
W. W. HINTON,
W. W. BELLEW.